(12) United States Patent (10) Patent No.: US 8,267,277 B2
Chameroy et al. (45) Date of Patent: Sep. 18, 2012

(54) COOKING RECEPTACLE WITH AT LEAST ONE PIVOTING HANDLE

(75) Inventors: Eric Chameroy, Veronnes (FR); Eric Christian Jacques Rhetat, Dijon (FR); Michel Pierre Cartigny, Mirebeau sur Beze (FR)

(73) Assignee: SEB. S.A., Ecully Cedex (FR)

( * ) Notice: Subject to any disclaimer, the term of this patent is extended or adjusted under 35 U.S.C. 154(b) by 771 days.

(21) Appl. No.: 12/097,063

(22) PCT Filed: Dec. 21, 2006

(86) PCT No.: PCT/FR2006/002821
§ 371 (c)(1),
(2), (4) Date: Oct. 29, 2008

(87) PCT Pub. No.: WO2007/077341
PCT Pub. Date: Jul. 12, 2007

(65) Prior Publication Data
US 2009/0218355 A1 Sep. 3, 2009

(30) Foreign Application Priority Data
Dec. 23, 2005 (FR) ...................................... 05 13409

(51) Int. Cl.
*B65D 25/28* (2006.01)
*A47J 45/10* (2006.01)
(52) U.S. Cl. ..................................................... 220/763
(58) Field of Classification Search .......... B65D 25/28; A47J 45/10, 45/08, 45/07, 45/06
See application file for complete search history.

(56) References Cited

U.S. PATENT DOCUMENTS

| 43,965 | A | * | 8/1864 | Avery | 220/763 |
| 537,546 | A | * | 4/1895 | Nellis | 220/263 |
| 597,217 | A | * | 1/1898 | Loery | 220/765 |
| 2,370,860 | A | * | 3/1945 | Hanke | 16/425 |
| 2,494,159 | A | * | 1/1950 | Bernstein | 220/759 |
| 3,683,452 | A | * | 8/1972 | Rickmeier et al. | 16/446 |
| 5,042,676 | A | * | 8/1991 | Gohlke | 220/759 |
| 5,887,751 | A | * | 3/1999 | Kroscher | 220/759 |
| 6,220,477 | B1 | * | 4/2001 | Schneider | 220/763 |
| 6,250,493 | B1 | * | 6/2001 | Kwan | 220/759 |
| 6,341,714 | B1 | * | 1/2002 | Bogani | 220/759 |
| 2005/0184079 | A1 | * | 8/2005 | Wade et al. | 220/762 |
| 2005/0188857 | A1 | * | 9/2005 | Garziera | 99/403 |

* cited by examiner

*Primary Examiner* — Mickey Yu
*Assistant Examiner* — Robert J Hicks
(74) *Attorney, Agent, or Firm* — Thomas, Kayden, Horstemeyer & Risley, LLP

(57) ABSTRACT

The invention relates to a kitchen receptacle (1) provided with at least one pivotally mounted handle means (2) suitable for pivoting from a deployed position in which it extends substantially radially relative to the wall (3) of the receptacle to a rest position in which it extends substantially non-radially, and vice versa, said kitchen receptacle being characterized in that said at least one pivotally mounted handle means (2) comprises:
  a base (5) fastened to the wall (3) of the receptacle;
  a handle (6) mounted on the base (5) to pivot between the deployed position and the rest position; and
  a locking means (7) designed to lock the handle (6) in its deployed position, said means being mounted to move on the base (5), and being under the control of a control means (8) that can be actuated by a user.

20 Claims, 5 Drawing Sheets

COOKING RECEPTACLE WITH AT LEAST ONE PIVOTING HANDLE

CROSS REFERENCE RELATED APPLICATIONS

This application is a national phase of PCT/FR02/002821 filed Dec. 21, 2006, which claims priority to French Application Serial No. 05/13409 filed Dec. 23, 2005.

TECHNICAL FIELD

The present invention relates to the general technical field of kitchen receptacles of all types designed to be used for preparing or cooking food, such a receptacle being provided with at least one pivotally mounted handle means that is suitable for taking up a deployed position in which it extends substantially radially from the wall of the receptacle and a rest position in which it extends substantially non-radially, and vice versa.

The present invention relates to a kitchen receptacle, e.g. a pressure cooker or a deep fryer, or indeed, more generally, a receptacle for assisting in various types of food preparation, said receptacle being provided with at least one pivotally mounted handle means that is suitable for pivoting from a deployed position in which it extends substantially radially relative to the wall of the receptacle to a rest position in which it extends substantially non-radially, and vice versa.

PRIOR ART

It is already known that kitchen receptacles, and in particular stewpots, saucepans, or even certain pressure cookers, can be provided with handles that are suitable for pivoting along the wall of the receptacle so as to take up either a deployed position in which the handle extends substantially radially relative to the wall, or a rest position in which the handle occupies a non-radial position, i.e., in general, a position in which it extends substantially parallel to the wall of the receptacle.

Such devices can be referred to as "pivoting handles" or "pivotally mounted handles". They make it possible to improve the compactness of the receptacle while it is not being used, and thus to facilitate storage of it, while also procuring appreciable space-saving in the storage zones that are used for storing that type of utensil.

For example, U.S. Pat. No. 3,683,452 is known that describes a handle that is pivotally mounted on a kitchen receptacle. That device is formed by a handle pivotally mounted via a stud to a base that is secured to the wall of the receptacle, said handle being provided with a wedging piece that comes into abutment under the rim of the receptacle when the handle is in the deployed position, and that wedges the handle relative to the receptacle by co-operating with the rim of said receptacle. Such a device already offers an appreciable advantage for the user, and is particularly simple. However, such a device is unstable and therefore dangerous insofar as the handle is not locked in the deployed position. Thus, when the handle(s) is/are in the deployed position, i.e. when they extend substantially radially relative to the walls of the receptacle, the handle(s) can, in the event of accidental manipulation by the user or merely while the user is attempting to pour out the contents of the receptacle, fold partially or totally away to their rest position, which, naturally, is dangerous for the user and for the surrounding environment.

More recent devices are also known that implement complex control systems that make it possible to lock the handle in the deployed position. In general, such a device comprises a control element mounted inside the pivotally mounted handle and on which the user acts, said control element making it possible to wedge the handle or to release it so as to enable it to pivot from its deployed position to its rest position and vice versa.

Although such devices undeniably procure additional comfort and safety for the user, they nevertheless suffer from drawbacks due, in particular and firstly, to their complexity because they implement a large number of parts that are mounted to move relative to one another. This makes the manufacturing and then assembly operations complex while also increasing the overall cost of such devices. In addition, such devices are both fragile, precisely because of the large number of moving parts necessary, and also often even not entirely safe because the device can jam or a part can break suddenly and in untimely manner during manipulation.

SUMMARY OF THE INVENTION

Objects assigned to the invention are thus to remedy the drawbacks of known devices and to propose a kitchen receptacle provided with a novel pivotally mounted handle means which, while being particularly stable in its deployed position, is nevertheless very simple to make, to mount on the receptacle, and to control, while having a cost that is as low as possible.

Another object of the invention is to propose a novel kitchen receptacle provided with a novel pivotally mounted handle means that is guided totally safely and that avoids any possibility of accidental manipulation.

Another object of the invention is to propose a novel kitchen receptacle provided with a novel pivotally mounted handle means that makes it possible for the parts to be moved and pivoted particularly easily and smoothly relative to one another.

Another object of the invention is to propose a novel kitchen receptacle provided with a novel pivotally mounted handle means that makes it possible for the handles to be locked automatically in a particularly safe manner.

Another object of the invention is to propose a novel kitchen receptacle provided with a novel pivotally mounted handle means that is particularly easy for the user to control.

The objects assigned to the invention are achieved by means of a kitchen receptacle provided with at least one pivotally mounted handle means suitable for pivoting from a deployed position in which it extends substantially radially relative to the wall of the receptacle to a rest position in which it extends substantially non-radially, and vice versa, said kitchen receptacle being characterized in that said at least one pivotally mounted handle means comprises:
  a base fastened to the wall of the receptacle;
  a handle mounted on the base to pivot between the deployed position and the rest position; and
  a locking means designed to lock the handle in its deployed position, said means being mounted on the base in a displaceable manner, and being under the control of a control means that can be actuated by a user.

BRIEF DESCRIPTION OF THE DRAWINGS

Other features and advantages of the invention appear in more detail on reading the following description given with reference to the accompanying drawings which are given by way of non-limiting example, and in which.

BEST MANNER OF IMPLEMENTING THE INVENTION

Figure 1:
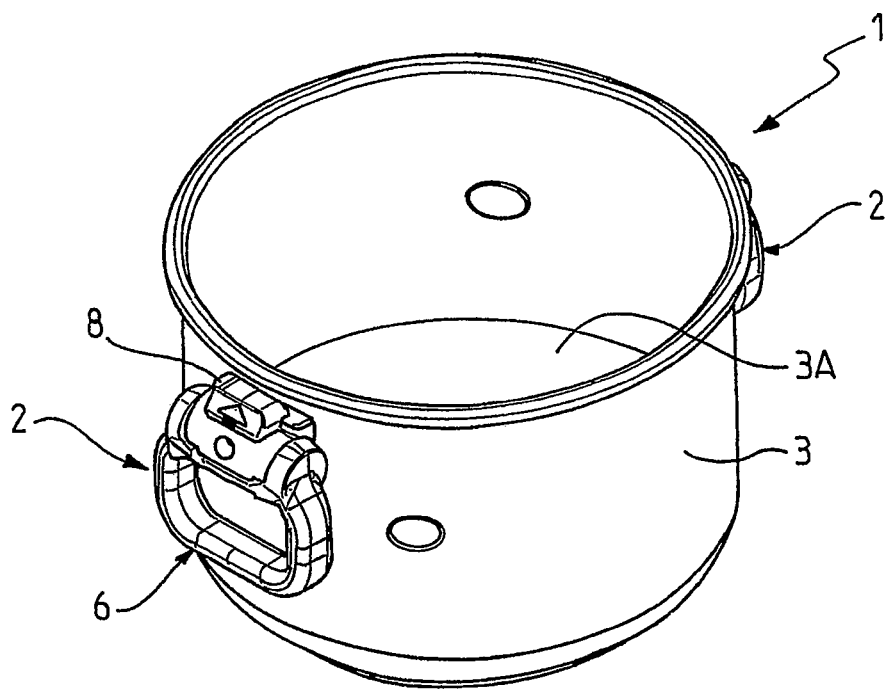
FIG. 1 is a perspective view of a kitchen receptacle of the invention having handle means in the rest position.

FIG. 1 shows a kitchen receptacle 1 provided with at least one pivotally mounted handle means 2 mounted on the wall 3 of the receptacle and comprising a handle 6. In the example shown merely by way of illustrative example, the cooking receptacle 1 is provided with two handle means 2 mounted in diametrically opposite manner on the wall 3 of said receptacle. Such a configuration is shown entirely by way of illustration, the invention relating to kitchen receptacles that can be equipped with a single pivotally mounted handle means or with a plurality of pivotally mounted handle means, the plurality not necessary being limited to two pivotally mounted handle means.

In the following description, based on the kitchen receptacle as shown in FIGS. 1 to 7 of the present patent application, reference is made to a kitchen receptacle formed by a pressure cooker bowl made of a metal material and designed to receive a lid (not shown in the figures) that is provided with a locking device of any known type, e.g. having jaws or bayonet-type means. The reference to a kitchen receptacle formed by a pressure cooker is merely illustrative, it being possible for the invention to apply to and to relate to any type of kitchen receptacle independently of the use for which it is designed, and of the material of which it is made, such kitchen receptacles being, for example and in a manner that is in no way limiting, pressure cookers, deep fryers, stewpots, frying pans, saucepans, or indeed food preparation receptacles of the mixer type or of some other type.

The invention thus relates to a kitchen receptacle 1 in the general sense that is provided with at least one handle means 2 and in particular its handle 6 that is pivotally mounted and is suitable for pivoting from a deployed position (FIG. 2, 3, or 5, for example) in which it extends in a direction that is substantially radial relative to the wall 3 of the receptacle, to or towards a rest position (FIG. 4) in which the handle means 2 extends in a direction that is substantially non-radial, or indeed extends in a direction that is substantially parallel to the wall 3. In its deployed position, the handle means 2 is locked and can pivot into its rest position and vice versa.

Figure 2:
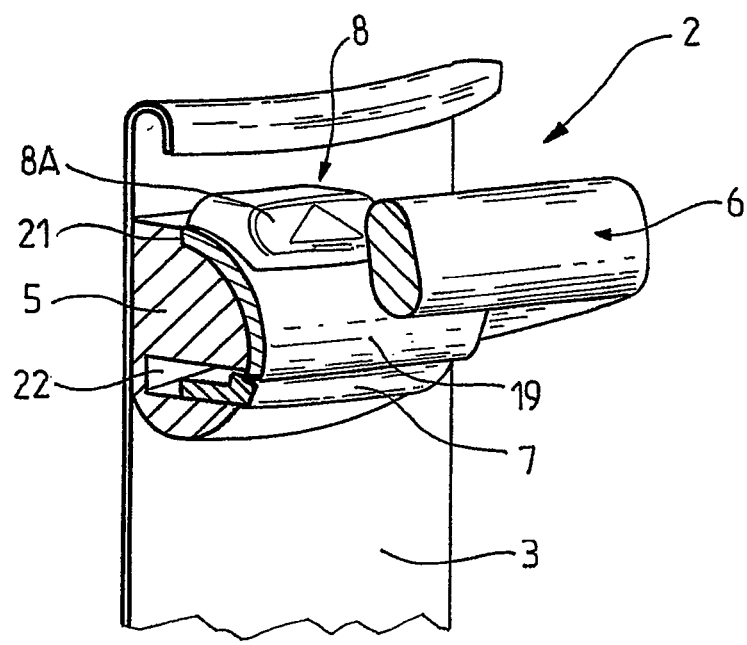
FIG. 2 is a fragmentary view partially in perspective and partially in side section showing a pivotally mounted handle means in the deployed position corresponding to a first variant embodiment of the invention.
Figure 3:
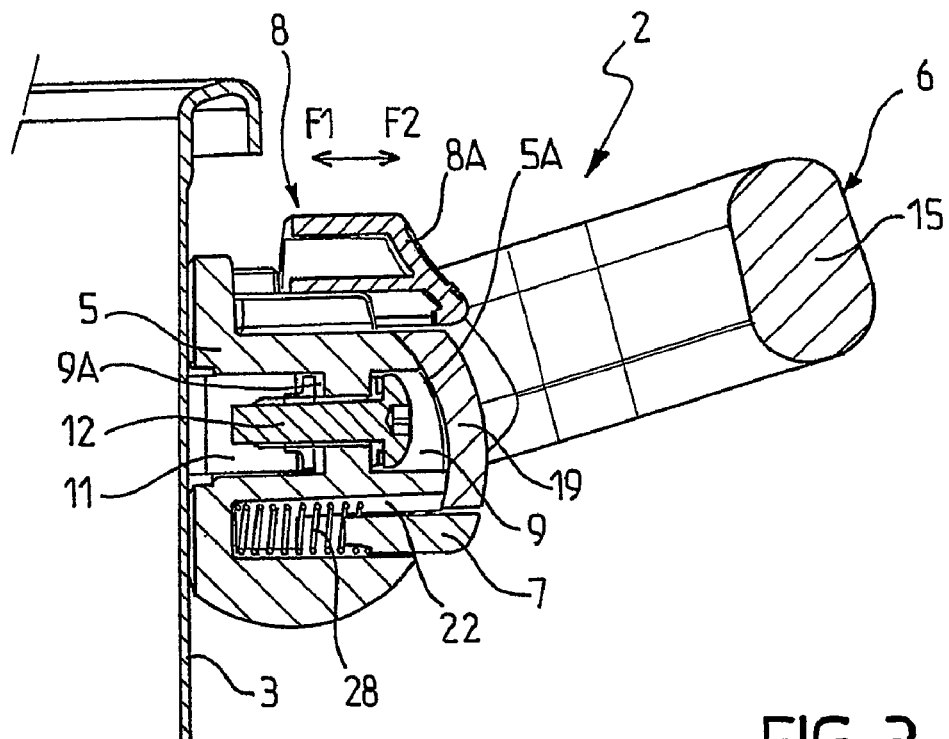
FIG. 3 is a cross-section view showing a pivotally mounted handle means in the deployed position and corresponding to a first variant embodiment of the invention.
Figure 4:
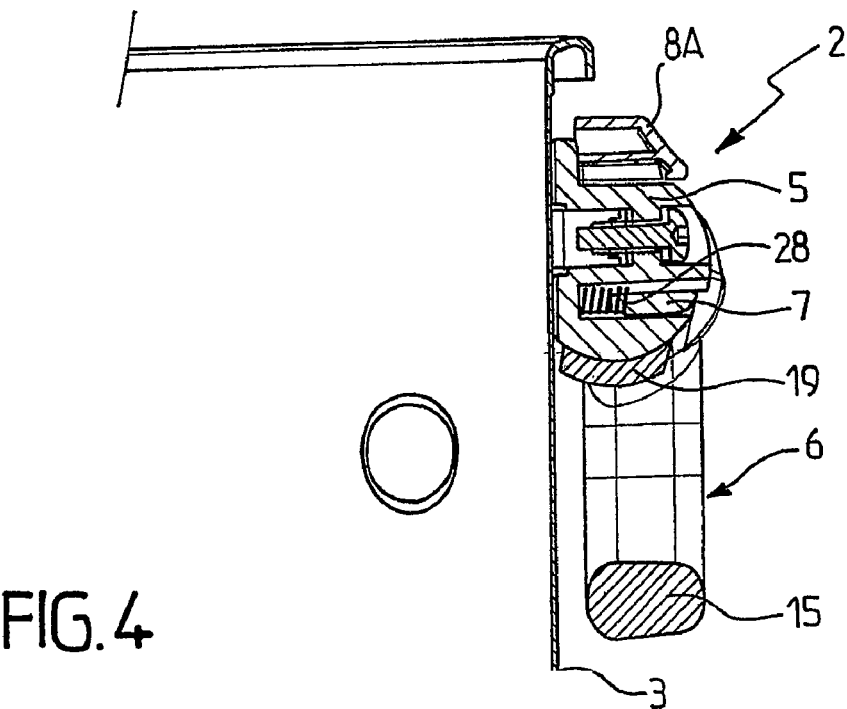
FIG. 4 is a cross-section view showing the handle means shown in FIG. 3 but in the rest position.

As shown, for example in FIGS. 2 to 4, the pivotally mounted handle means 2 of the invention comprises:

- a base 5 fastened to the wall 3 of the receptacle;
- a handle 6 mounted on the base 5 to pivot between the above-defined deployed position and the above-defined rest position; and
- locking means 7 designed to lock the handle 6 in its deployed position, said locking means 7 being mounted to move on the base 5 and being under the control of a control means 8 that can be actuated by a user.

In other words, the locking means 7 is mounted on the base 5 in a manner such as to be movable relative thereto, i.e. it is incorporated into the base and enjoys a certain amount of mobility relative thereto.

In addition, the control means 8, like the locking member 7, is preferably mounted on the base, thereby facilitating actuation of the control means 8 by the user while also: reducing the risks of accidental manipulation, increasing the overall strength, and also facilitating assembly.

In accordance with the invention, the base 5 can be in the form of a substantially frustoconical part made of metal or of plastics material, for example, provided with one or more recesses 9, 9A opening out freely outwards or inwards in a manner such as to receive means for fastening it to the wall 3 and to procure such fastening. As shown in FIG. 3, the base 5 is advantageously fastened to the wall via a bracket 11 that is secured, e.g. by welding, to the wall 3, the base 5 being mounted via one of its recesses 9A over the bracket 11, and being fastened permanently thereto via a fastener, such as a screw 12. It is thus possible to obtain mounting that is particularly simple, easy, and strong for the entire pivotally mounted handle means 2.

In this first variant embodiment, the fastener means used result in a pivotally mounted handle means that is fastened permanently to the wall 3. However, it is possible to imagine implementing pivotally mounted handle means 2 that are not fastened permanently to the wall 3, but rather that are fastened with a possibility of being removed quickly so that, in the meaning of the invention, the term "pivotally mounted handle means" should be considered to cover both pivotally-mounted handle means 2 that are fastened permanently, i.e. that are not easily removable by the user, and removable pivotally mounted means that can be removed very easily and quickly by the user.

The handle 6 is in the form of a U-shaped handle (e.g. FIG. 7) with a graspable central zone 15 and two side branches 16A, 16B that have their respective ends 18A, 18B connected together by a link bar 19. The handle 6 is mounted to pivot on the base 5 via studs 20 carried by the ends 18A, 18B.

Figure 7:
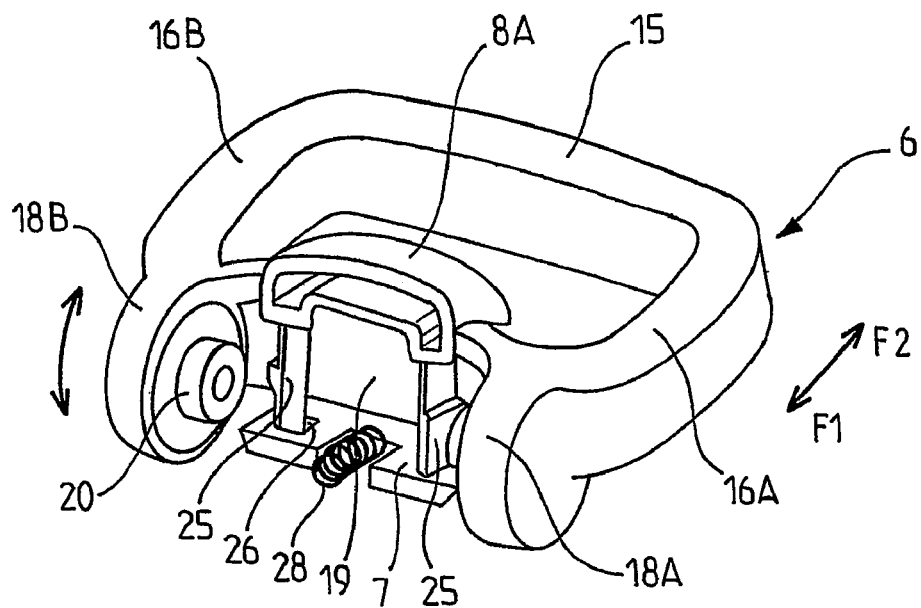
FIG. 7 is a fragmentary perspective view of an implementation detail of the first variant embodiment of a pivotally-mounted handle means of the invention.

As can be seen in FIGS. 2, 3, and 7, and in a feature that can constitute a separate invention, i.e. independently of the whether or not the locking means 7 is present, the handle means 2 is provided with pivotal guide means for guiding the handle 6 as it pivots on the base 5.

Advantageously, the guide means comprise a curved slider piece provided on the handle 6, which slider piece co-operates with a slide path 5A of complementary curvature, said slide path 5A being provided on the base 5.

As shown in FIGS. 2, 3 and 7, the guide means are advantageously formed by the link bar 19 whose curvature is complementary to the slide path 5A situated on the outside face of the base 5, the link bar 19 thus coming to be guided pivotally over said slide path 5A.

By means of this assembly configuration, excellent guidance is obtained for guiding the parts, thereby imparting excellent robustness and excellent safety to the assembly.

By adding pivotal guide means that are distinct from the bearing surfaces of the studs 20, it is possible to offer an additional contact area between the handle 6 and the base 5, said area forming an additional bearing surface, thereby contributing to limiting slack in the pivot coupling and to improving the bedding of the handle 6 relative to the base 5.

Advantageously the base 5 is provided with an abutment 21 which, in the variant embodiment shown in FIGS. 2, 3, and 7, is situated at the top portion of the base 5, against which abutment 21 the handle 6 comes to be applied in the deployed position while also being locked in position by the locking means 7, so as to be locked in situ in the two possible opposite pivot directions of the handle 6.

As shown in FIG. 2, the abutment 21 is in the form of a longitudinal groove provided in the base 5 itself and against which the end face or edge of the link bar 19 comes into abutment. By means of this feature, the deployed position is thus particularly stable and safe.

In this first variant embodiment, the locking means 7 is mounted to move resiliently inside the base 5. As shown in FIGS. 2, 3, 4, and 7, the locking means 7 is formed by a bearing plate mounted to slide freely in a slot 22, substantially normal to the wall 3 and provided in the base 5, the handle 6 coming into abutment, advantageously via the bottom end face or edge of the link bar 19, on or against which the plate can be locked in the deployed position. In the deployed position, the handle 6 is thus locked in both of the possible pivot directions about the axis of the studs 20, in a first direction by the abutment 21 and in the opposite other direction by the locking means 7 which, in this example, is constituted by the bearing plate.

In the first variant embodiment shown in FIGS. 1 to 4 and 7, the control means 8 is formed by a piece distinct from the locking means 7. It is advantageously formed by a button 8A that is guided movably on the base 5, that is preferably mounted at or on the top portion of the base 5, and that is provided with at least one control leg 25 (FIG. 7) connected to the locking means 7.

Advantageously, as shown in FIG. 7, the button 8A is mounted to move in translation on the base 5 in the directions F1 and F2, and it has two substantially parallel legs 25 passing through the base 5 and coming to engage the bearing plate 7 in order to cause it to move in translation via respective orifices 28 in which said legs 25 come to be engaged.

Advantageously, the bearing plate 7 is mounted to move resiliently inside the slot 22 via a compression spring 28 that biases said bearing plate 7 permanently in the direction F2 as shown in FIG. 3.

Thus, when the handle is in the rest (or lowered) position (FIG. 4), the bearing plate 7 is fully engaged into the slot 22, and the link bar 19 covers the opening of the slot 22, while the button 8A is in its position in which it is closer to the wall 3. In order to reach its deployed position (FIG. 3), the bearing plate 7 moves in translation as indicated by the arrow F2 towards its locking position in which it supports and locks the link bar 19. The button 8 is also moved in translation in the same direction F2 since its movement is associated with the movement of the bearing plate 7 so as to take up its second position in which it is further away from the wall 3.

In this variant embodiment, the user, starting from the deployed position shown in FIG. 3, pushes or presses on the button 8A in the direction F1, thereby causing the button 8A to move towards the wall 3. By moving as indicated by arrow F1, the button 8 drives, via its legs 25, the locking means 7, i.e. the bearing plate, also in the direction F1 inside the recess 22 against the reaction force exerted by the spring 28 until the locking means release the bottom portion of the link bar 19, thereby enabling the handle 6 to pivot freely until it reaches its final rest position shown in FIG. 4.

In this variant embodiment, the handle means 6 is designed so that, in the rest position, the handle 6 extends towards the base of the receptacle, i.e. towards the bottom 3A of the receptacle. In the version shown in FIGS. 1 to 4, the abutment 21 is situated above the locking means 7.

Figure 5:
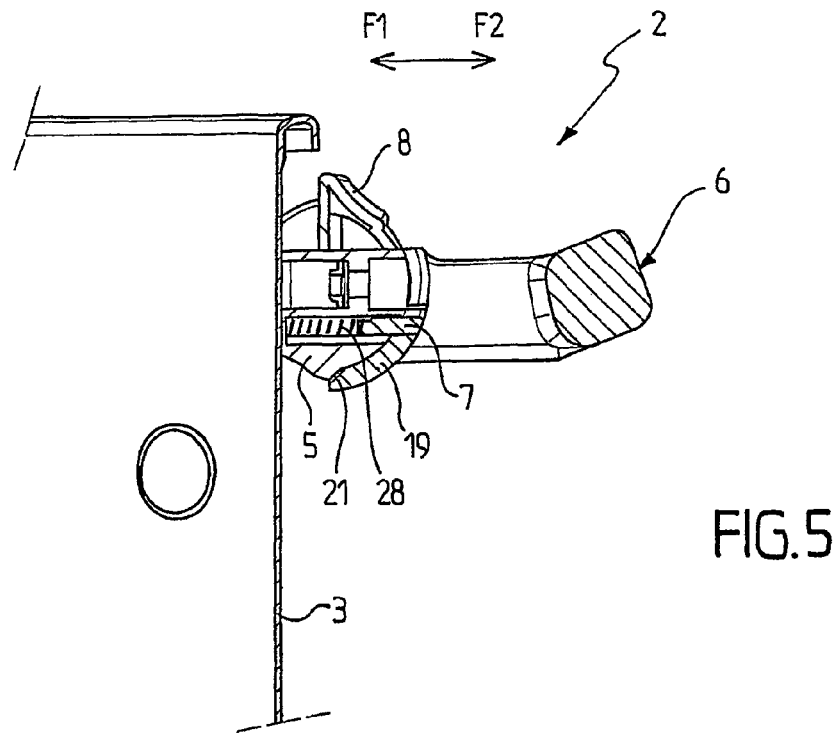
FIG. 5 is a cross-section view of a pivotally mounted handle means in the deployed position corresponding to a second variant embodiment of the invention.
Figure 6:
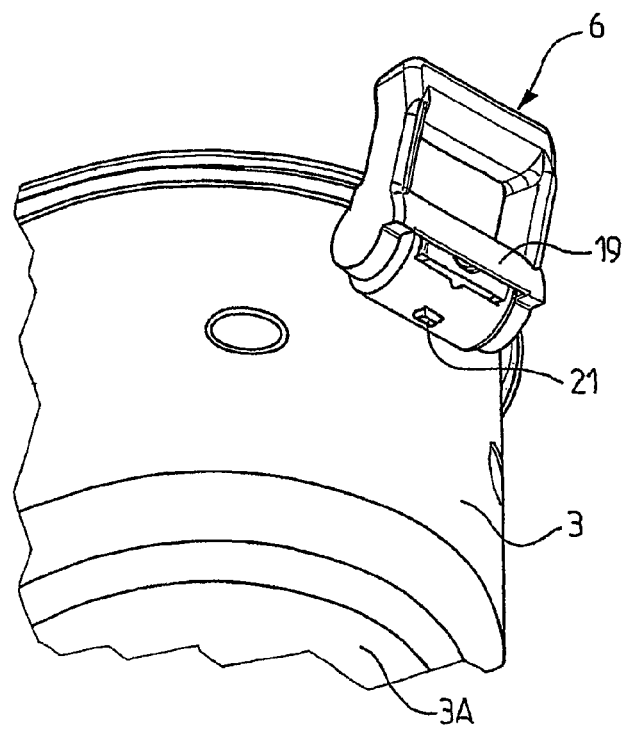
FIG. 6 is a fragmentary perspective view of the handle means of FIG. 5 corresponding to the second variant embodiment, the handle means being in the rest position.

In a variant embodiment shown in FIGS. 5 and 6, the handle means 6 is designed so that, in the rest position (FIG. 6), the handle means 6 extends upwards, towards the opening in the receptacle, starting from its substantially radial deployed position.

This second variant embodiment differs from the variant shown in FIGS. 1 to 4 only by the position of the abutment 21 which, instead of being situated above the locking means 7, is situated below the locking means 7 on the base 5, as shown in FIG. 5. The abutment 21 is thus provided at the bottom portion of the base 5 such that the bottom portion of the link bar 19 comes into abutment against said abutment 21 when the handle 6 is in a substantially radial position, i.e. when it is substantially perpendicular to the wall 3. In this position, as shown in FIG. 5, the bar 19 is shaped and dimensioned so that the locking means 7, as biased by the spring 28 in the direction F2, comes against and bears against the top edge of the link bar 19 so as to lock the handle 6 completely in its deployed position.

As in the first variant embodiment, action by the user on the control means 8 by pressing in the direction F1 causes the locking means 7 to move in the same direction F1, thereby releasing the locking means 7 which can then retract fully into the slot 22 to enable the user to raise the handle 6 to its high position shown in FIG. 6, which corresponds to the rest position.

Figure 8:
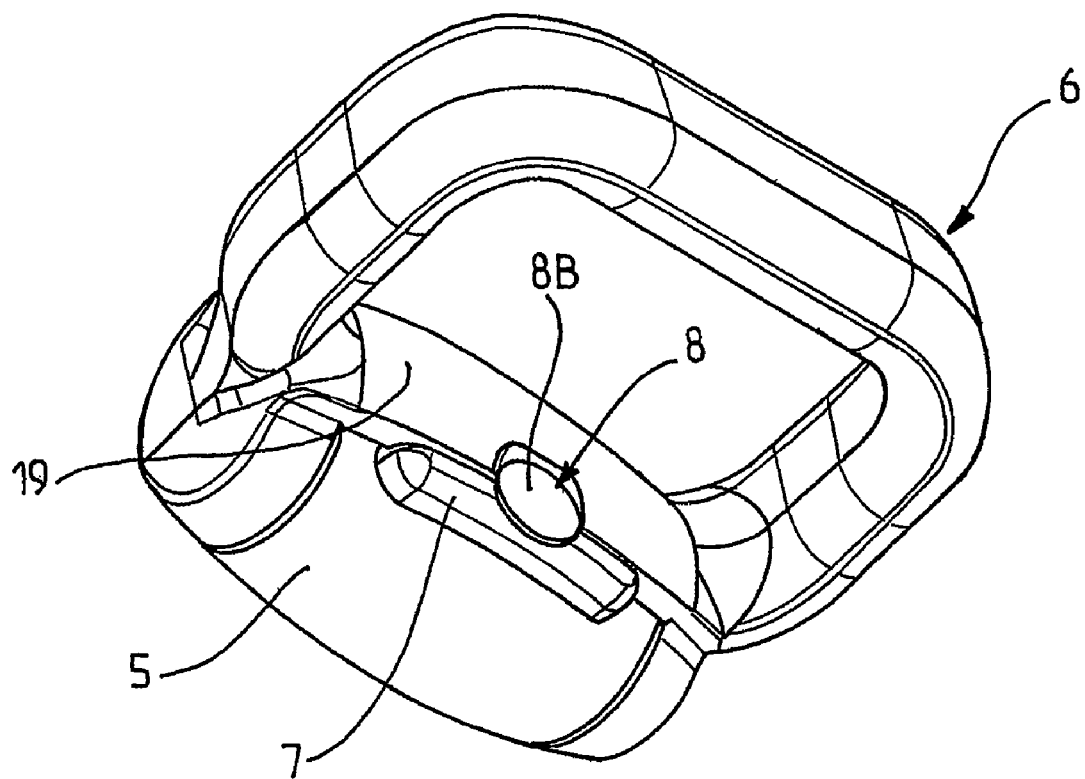
FIG. 8 is a perspective view showing a variant of the invention in which the locking means and the control means are integral parts of the same piece.

In another variant embodiment that is particularly simple (FIG. 8), it is possible to implement either of the variants shown in FIGS. 1 to 7 by having the general control function (control means 8) for controlling the movement of the locking means 7 performed not by a button 8A that is independent of and distinct from said locking means 7, but rather by the locking means 7 itself, in particular by a portion of said locking means.

In this way, the locking means 7 performs two functions, namely the function of the locking means and also the function of the control means. In this variant embodiment, the button 8A shown in FIGS. 1 to 7 is omitted, and the user causes the locking means 7 to move in translation directly by acting on the locking means 7, e.g. on a suitable zone or portion 8B that is dedicated for this purpose and that is situated on the edge, as shown merely diagrammatically in FIG. 8 in which the pivotally mounted handle means 2 is in the deployed position.

Figure 2A:
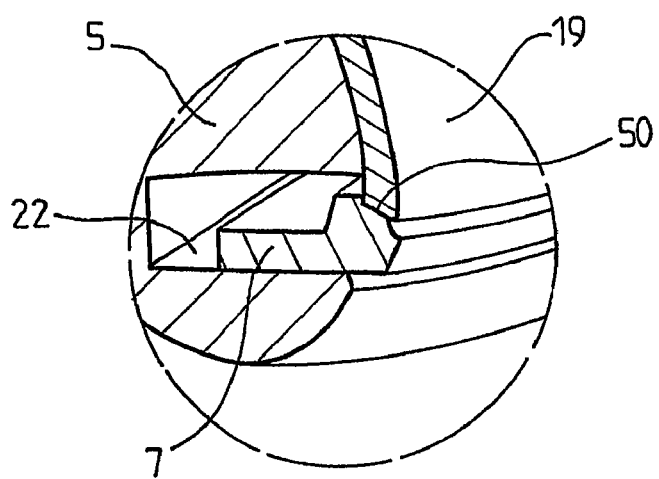
FIG. 2A is a view showing an implementation detail and taken from an enlargement of a portion of FIG. 2.

By way of a particularly advantageous variant, it is possible to provide a system for taking up slack on the handle means 2 as shown in FIG. 2A. Thus, the handle means 2 are provided with a slack-take-up system designed to guarantee that locking is safe and precise under all circumstances. Advantageously, it is formed by a slope 50 provided on the locking means 7, preferably at that end portion of the bearing plate 7 that is designed to come into contact with and to support the handle 6, in particular the bottom edge of the link bar 19. Said slope 50, which extends over the entire width of the bearing plate and towards the handle 6, makes it possible to accommodate any dimensional differences between the parts and thus to obtain locking that is safe.

It is remarkable that a slack-take-up system of the invention, i.e. that implements a moving wedge suitable for compensating for any slack beginning to form between the component parts of the handle means 2, more particularly when said handle means is in the deployed position, is suitable for being adapted to any type of handle means 2 equivalent to the above type. In particular, it is possible to imagine incorporating a slack-take-up system into the locking means 7 even if said locking means 7 is mounted on the handle 6 instead of being mounted on the base 5.

The device of the invention thus makes it possible to obtain pivotally mounted handles that are stable both in the deployed position and in the rest position. This also imparts excellent strength and excellent safety to the assembly, in particular while the receptacle is being carried.

In accordance with the invention, and in a particularly advantageous variant embodiment, the handle means 2 can also be a one-piece unit, i.e. they can form an integral single part in which all of the elements are pre-assembled together, thereby making it particularly simple to mount on the receptacle. In which case, the handle 6, the base 5 and its component parts, including the control means, are mounted directly, e.g. by screw-fastening to the bracket 11.

The mechanism is also particularly ergonomic and the actions involved in using it are easily understandable and memorizable by the user, given the shapes and the locations of the parts, in particular the control and locking parts.

The locking mechanism is particularly strong and it procures an impression of the mechanism being very safe because of its robustness and because of the full locking that is guaranteed. Safety is obtained that is appreciable in particular when tipping the receptacle.

SUSCEPTIBILITY OF INDUSTRIAL APPLICATION

The invention finds its industrial application in design, manufacture, and use of kitchen receptacles designed for preparing or cooking food.

The invention claimed is:

1. A kitchen receptacle (1) provided with at least one pivotally mounted handle means (2) suitable for pivoting from a deployed position in which it extends substantially radially relative to a wall (3) of the receptacle to a rest position in which it extends substantially non-radially, and vice versa, said kitchen receptacle being characterized in that said at least one pivotally mounted handle means (2) comprises:
    a base fastened to the wall (3) of the receptacle;
    a handle (6) mounted on the base (5) to pivot between the deployed position and the rest position; and
    a locking means (7) designed to lock the handle in its deployed position, said locking means being mounted on the base in a displaceable manner, and being under the control of a control means that can be actuated by a user,
    the locking means (7) being formed by a bearing plate mounted to slide freely in a slot (22) provided in the base (5), the handle (6) coming into abutment on said plate so as to be locked in position, the locking means being displaceable horizontally by the user to drive the bearing plate into said slot (22) for pivoting the handle to the rest position from the deployed position.

2. A receptacle according to claim 1, in which the base (5) is provided with an abutment (21) against which the handle (6) comes to be applied in the deployed position, while being locked in position by the locking means (7) so as to be locked in place in both of the opposite pivoting directions.

3. A receptacle according to claim 1, in which the handle means (2) has pivotal guide means for guiding the handle (6) as it pivots on the base (5).

4. A receptacle according to claim 3, in which the guide means comprises a curved slider piece provided on the handle (6), which piece co-operates with a slide path (5A) of complementary curvature that is provided on the base (5).

5. A receptacle according to claim 1 in which the locking means (7) is mounted to move resiliently in the base (5).

6. A receptacle according to claim 1 in which said control means (8) is mounted on the base (5), and is provided with at least one control leg (25) connected to the locking means (7).

7. A receptacle according to claim 6, in which a button (8A) is mounted to move in translation on the base (5) and includes two legs (25) passing through the base (5) and coming to engage the bearing plate in order to move said bearing plate in translation.

8. A receptacle according to claim 1 in which said control means (8) is formed by a portion (8B) of the locking means (7) that is accessible to the user.

9. A receptacle according to claim 1 in which the handle means (2) is designed so that, in the rest position, the handle (6) extends towards the base of the receptacle (1), i.e. towards the bottom of the receptacle.

10. A receptacle according to claim 2 in which the abutment (21) is situated above the locking means (7).

11. A receptacle according to claim 1 in which the handle means (2) is designed so that, in the rest position, the handle (6) extends upwards towards an opening of the receptacle.

12. A receptacle according to claim 2 in which the abutment (21) is situated below the locking means (7).

13. A receptacle according to claim 1 in which the handle means (2) is in the form of a one-piece unit.

14. A receptacle according to claim 1 in which the handle has a slack-take-up system.

15. A receptacle according to claim 14, in which the slack-take-up system is formed by a slope (50) provided on the locking means (7).

16. A receptacle according to claim 1 in which the receptacle is selected from the group consisting of pressure cookers, deep fryers, stewpots, frying pans, saucepans, bowls, food preparation receptacles, and mixers.

17. A receptacle according to claim 1 in which the handle (6) is in the form of a U-shaped handle.

18. A receptacle according to claim 17 in which the U-shaped handle (6) has a graspable central zone (15) and two side branches (16A, 16B) having ends (18A, 18B), and a link bar (19) for connecting the respective ends.

19. A receptacle according to claim 18 in which the link bar (19) has a bottom end face or edge and the handle (6) comes into abutment, via the bottom end face or edge of the link bar (19), on or against the bearing plate so as to be locked in the deployed position.

20. A receptacle according to claim 18 in which the handle means (2) has pivotal guide means for guiding the handle (6) as it pivots on the base; said base having an outside face forming a slide path (5A) and in which the guide means is formed by the link bar (19) whose curvature is complementary to the slide path (5A) situated on the outside face of the base (5), the link bar (19) thus coming to be guided pivotally over said slide path (5A).

* * * * *